(12) United States Patent  
Perttola

(10) Patent No.: US 7,377,209 B2
(45) Date of Patent: May 27, 2008

(54) HOT DOG COOKER

(75) Inventor: Arne Scott Perttola, Fairfield, OH (US)

(73) Assignee: Gold Medal Products Co., Cincinnati, OH (US)

(*) Notice: Subject to any disclaimer, the term of this patent is extended or adjusted under 35 U.S.C. 154(b) by 824 days.

(21) Appl. No.: 10/926,924

(22) Filed: Aug. 26, 2004

(65) Prior Publication Data

US 2006/0042474 A1  Mar. 2, 2006

(51) Int. Cl.
*A47J 37/06* (2006.01)
*B65D 25/04* (2006.01)

(52) U.S. Cl. .................... 99/343; 99/339; 99/393; 99/402; 99/422; 99/423; 99/426; 99/443 R; 99/441; 99/443 C; 99/448; 99/449; 220/529; 220/533; 220/543; 220/544; 220/546

(58) Field of Classification Search ................. 99/339, 99/393, 402, 422–3, 343, 426, 443 R, 441, 99/443 C, 448–9; 220/529, 533, 543–4, 220/546
See application file for complete search history.

(56) References Cited

U.S. PATENT DOCUMENTS

| 2,775,189 A | 12/1956 | Scholl ..................... 99/427 |
| 3,657,995 A | 4/1972 | Adamitis ................ 99/443 R |
| 4,355,569 A | 10/1982 | Sage ........................ 99/427 |

*Primary Examiner*—Shawntina Fuqua
(74) *Attorney, Agent, or Firm*—Wood, Herron & Evans LLP

(57) ABSTRACT

Apparatus comprising a hot dog cooker having a rack with flat faced bars configured to move above and along a cooking surface so as to cause hot dogs to rotate along heated ridges of the surface. The ridges mark the hot dogs circumferentially as they are rolled along the cooking surface by the moveable rack. Methods are disclosed.

19 Claims, 3 Drawing Sheets

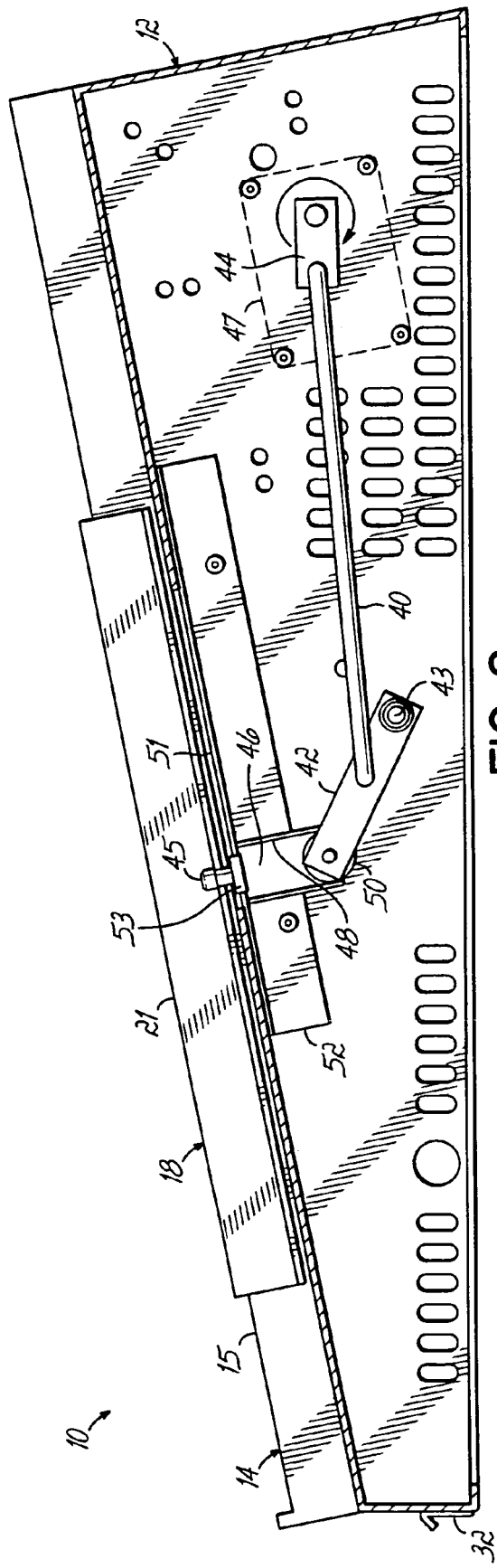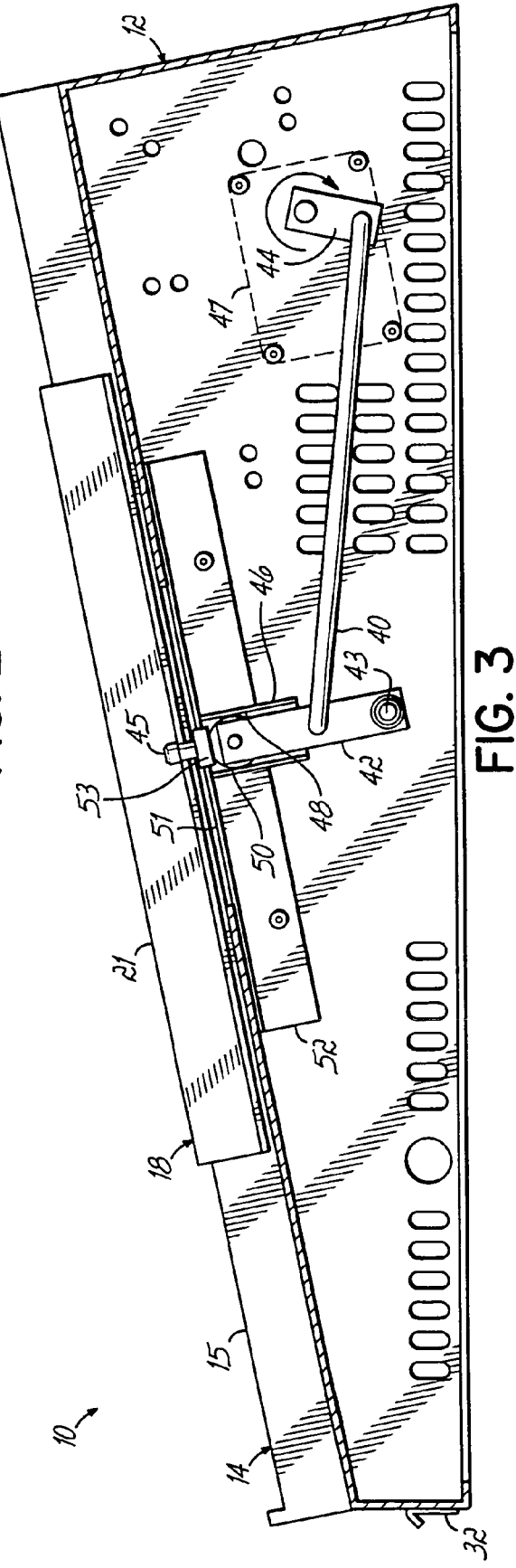

HOT DOG COOKER

FIELD OF THE INVENTION

The present invention relates to cookers for hot dogs, sausages and other meat products, and more particularly, to cookers that rotate a number of hot dogs with respect to a heating source.

BACKGROUND OF THE INVENTION

A national passion for hot dogs has lead to numerous advances in their preparation. For example, a number of cookers have been devised that rotate hot dogs with respect to a heat source in order that they are cooked uniformly and at the same time. Some such rotating cookers include, for instance, a ferris wheel type structure or a horizontal series of heated rollers unto which hot dogs are placed. Another cooker uses rods that are made to move along a heated surface to roll hot dogs as they cook.

To improve the visual aesthetics of the meat, hot dogs are routinely pressed in a panini grill prior to cooking in the rotary device. The panini grill includes raised, heated surfaces that mark hot dogs to simulate grill marks when the lid of the panini grill is lowered and pressed against the hot dogs. The hot dogs are then removed from the panini grill and placed into the hot dog cooker, which rolls and heats the hot dogs.

Many hot dog enthusiasts find hot dogs with grill marks to be more aesthetically pleasing than those without, translating into increased sales and consumer satisfaction. Conventional processes for placing grill marks on rotary cooked hot dogs, however, are not without problems. For instance, the pressing action required by the panini grill structure often results in the skin of the hot dog rupturing when the lid of the panini grill is lowered. Such rupturing can cause the juices of the hot dog to escape. This loss of moisture translates into a less appetizing hot dog, as well as steam that can carbonize and scorch cooking equipment. Such steam further poses an inconvenience and potential hazard to vendors.

Because the panini grill is not configured to actually cook hot dogs, an additional rotary cooking machine is required. This use of both grill types requires the vendor to transfer the hot dogs between the hot grills. This step involves additional inconvenience to the vendor and potential for damage to the hot dog and equipment. Moreover, the requirement for both machines poses space concerns in a typical vendor locale. For instance, a vendor's countertop may not have adequate room for two such machines. Such space concerns are further compounded by the presence of a hood required by conventional rotary cookers for heat considerations. That is, cookers generating a surface heat temperature of greater than 230° Fahrenheit must have a hood for heat containment. Conventional cookers that push hot dogs along a heated surface are also prone to problems that arise when part of a hot dog becomes trapped between a moving rod and the heated surface. Such an occurrence too often results in undesired lifting of the rods and results in the meat rolling off onto the floor or to the lower portion of the cooking surface.

A need therefore exists for an improved hot dog cooker.

SUMMARY OF THE INVENTION

The present invention provides an improved method and apparatus for cooking hot dogs. More particularly, a hot dog cooker is provided that simultaneously provides grill-like marks on hot dogs as they are cooked. To this end, the invention includes a hot dog cooking apparatus that comprises a cooking surface positioned above a base and inclined in a first direction. The inclined cooking surface includes ridges that extend in the first direction.

A moveable rack positioned above the cooking surface includes bars generally oriented in a direction transverse to the first. The bars are spaced apart from one another for receipt of a hot dog therebetween. The moveable rack is moveable in the first direction such that the bars roll the hot dog along the ridges of the inclined cooking surface. In one embodiment, the bars are parallel and rectangular in cross-section. The bars push the hot dogs along the ridges so that the hot dog rolls or otherwise rotates along the cooking surface. The ridges are heated for marking the hot dogs thereon circumferentially.

These features thus automatically and circumferentially mark the hot dogs as they are rolled along the cooking surface. Grill marks are made on the hot dogs without necessitating separate machines or additional hooding, as with conventional hot dog cooking devices and practices. This advantageous feature is achieved, in part, because the meat is fully cooked without generating a surface heat temperature of greater than about 230° Fahrenheit.

Various additional advantages, objects and features of the invention will become more readily apparent to those of ordinary skill in the art upon consideration of the following detailed description of embodiments taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 2 is a side view of the hot dog cooker taken along lines 2-2 of FIG. 1.

FIG. 3 is another side view of the hot dog cooker of FIG. 1, similar to FIG. 2, having its moveable rack in a second position.

DETAILED DESCRIPTION OF THE DRAWINGS

Figure 1:
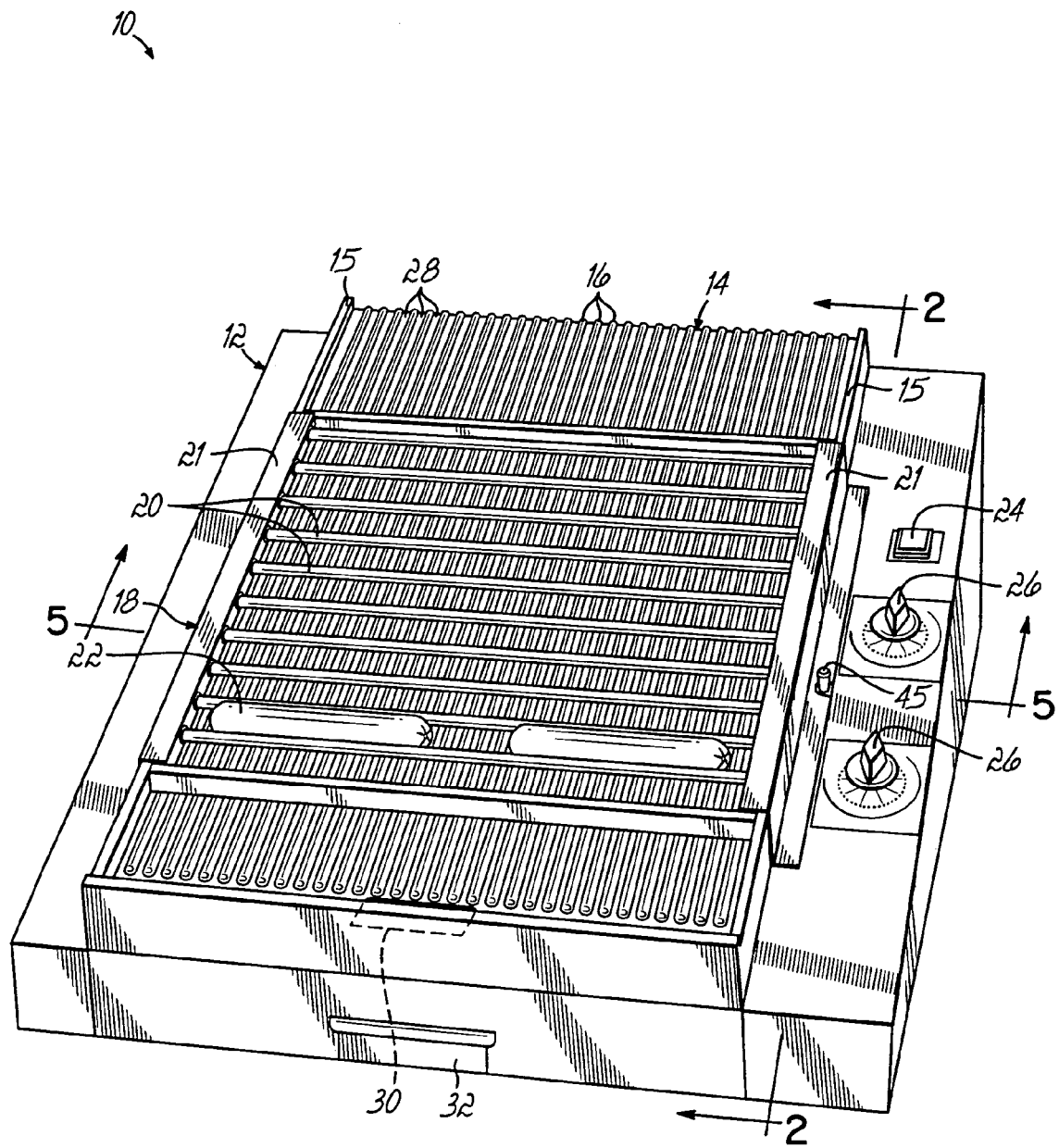
FIG. 1 illustrates a hot dog cooker having a rack configured to move along a cooking surface so as to cause hot dogs to rotate along ridges of the surface.

FIG. 1 shows a hot dog cooker 10 having a rack 18 configured to move along a cooking surface 14 so as to cause hot dogs 22 to rotate along ridges 16 of the cooking surface 14. More particularly, the cooker 10 includes a base 12 upon which a cooking surface 14 is positioned. The cooking surface 14 includes heated ridges 16 that mark a hot dog 22 as the moveable rack 18 rolls the hot dog 22 along the ridges 16.

As shown in FIG. 1, the base 12 is inclined along an upper portion and primarily comprises a sheet metal enclosure. The base 12 includes an on/off switch 24, as well as heater controls 26 and associated circuitry configured to manage the heat produced by heating elements operatively disposed under surface 14. Though not shown in FIG. 1, the heating elements are positioned inside the base and proximate the underside of the cooking surface 14. Heat from these elements is thus communicated to the hot dogs 22 through the cooking surface 14. One skilled in the art will appreciate such user controls 24 and 26 may be augmented, substituted and rearranged with additional controls known in the art.

The cooking surface 14 positioned above the base 12 typically comprises an aluminum, non-stick alloy. The ridges 16 of the cooking surface 14 extend in parallel along a first direction. The ridges 16 may be spaced about one-half inch apart and may be raised above the cooking surface 14 by a height of about 0.13".

The cooking surface 14 may also include side grooves 28 for collecting and channeling grease and juices towards a grease drain 30. The cooking surface 14 additionally overhangs the base 12 to prevent grease from going inside the cooker 10. A removable tray 32 may be pulled out to discard the grease. This feature thus allows the grease to be automatically collected and removed.

The moveable rack 18 positioned above the inclined cooking surface 14 includes bars 20. The bars 20 are generally oriented transverse to the first direction, i.e., the direction of the ridges 16. The bars 20 are typically elongated, rectangular and spaced to receive a hot dog therebetween. For instance, the bars 20 may be spaced from each other by a distance of about 1¾". The bars 20 are typically positioned about 0.080" above the ridges 16. A flat surface of each bar 20 that faces a hot dog 22 pushes and rolls the hot dog 22 according to the movement of the rack 18. The raised, flat surface of the bars 20 thus mitigate the chances of a hot dog 22 becoming stuck between the cooking surface 14 and the rack 18. This feature thus accomplishes desired rolling of the hot dogs 22 with a diminished possibility of the rack 18 becoming raised, derailed, or otherwise impeded.

The moveable rack 18 also includes a pair of rack overhangs 21. Each rack overhang 21 couples via a respective pin 45 to a track extension 46 located below the overhang 21. As discussed below in the text describing FIG. 2, the moveable track 18 is made to travel over the cooking surface 14 as the track extension is actuated. As such, the rack 18 comprises a combination of the bars 20 and the overhang 21.

FIG. 2 shows a cross-sectional view of the hot dog cooker 10 of FIG. 1 taken along lines 2-2. In one respect, FIG. 2 includes a side view of the hot dog cooker 10 with its moveable rack 18 in a first position relative to the cooking surface 14. This first position corresponds to the most forward and relatively lowest position attainable by the moveable rack 18 relative to the incline of the cooking surface 14 in this embodiment. The moveable rack 18 is made to achieve this and other positions while it rolls hot dogs 22 along the ridges 16 of the cooking surface 14.

To accomplish the reciprocating motion desired to roll the hot dogs 22, the moveable rack 18 couples to a series of links 40, 42 and 44 configured to communicate forces from a rotating drive link 44. The rotating drive link 44 is rotationally driven by an actuator 47, which is positioned inside the base 12 in any manner known in the art. A typical actuator comprises a motor and a gearbox configured to transfer forces to the rotating drive link 44. As such, the actuator 47 may cause the rotating drive link 44 to continuously rotate at a selectable constant or variable velocity during a cooking operation.

As shown in FIG. 2, a wheel 50 is located within the channel-shaped or flanged track extension 46. As will be apparent after a complete reading of the specification, the wheel 50, when actuated, moves vertically within the channel 48 of extension 46 and communicates forces with a horizontal vector to the track extension 46. These forces cause the track extension 46 to move along a slot 51 cut out from an L-shaped bracket 52 having legs 52a, 52b, as shown also in FIG. 5. More particularly, extension 46 includes a transverse lip 53 having legs 53a, 53b oriented through slot 51 and over leg 53a. This lip 53 slides over leg 52b of bracket 52 and along the slot 51 in response to forces from the wheel 50 and associated links 40, 42 and 44. Movement of the track extension 46 initiated by the horizontal forces ultimately causes the moveable rack 18, which is attached via pin 45, to slide along the supporting edges 15 of the cooking surface 14.

To this end, the wheel 50 is rotatably mounted to a pivot link 42 coupled to a main drive link 40. The pivot link 42 is pivotably fastened to base 12 via shaft 43. In one embodiment, the shaft 43 includes a rod that extends the width of the interior of the base 12 and connects to a corresponding pivot linkage on the opposite side of the cooker 10. In any case, the pivoting feature of the pivot link 42 and shaft 43 facilitates and provides travel of the moveable rack 18. The rotating drive link 44, as discussed herein, connects in a known manner to the actuator 47 positioned inside the base 12. The actuator 47 causes the rotating drive link 44 to rotate in a clockwise fashion, as shown in FIG. 2. In this manner, the main drive link 40 is actuated by the rotating drive link 44. Movement of the rotating drive link 44 causes the main drive link 40 to actuate the pivot link 42, which communicates the associated forces to the wheel 50 and drives it to and fro in an arcuate segment. The track extension 46 moves according to the wheel 50 movement, which pushes the moveable rack 18 along the cooking surface 14.

Hot dogs 22 are thus marked as they are rolled along the cooking surface 14. This provides grill marks on the hot dogs 22 without necessitating separate machines or a hood, as with conventional hot dog cooking devices and practices.

FIG. 3 is another side view of the hot dog cooker 10 of FIG. 1. In FIG. 3, however, the moveable rack 18 of the hot dog cooker 10 is in a second position. In terms of FIG. 2, the rotating drive link 44 has rotated in a clockwise fashion, which ultimately has caused the wheel 50 to travel inside the track extension 46 in a direction towards the moveable rack 18. This movement has caused the moveable rack 18 to move up the incline of the cooking surface 14 to an intermediate position relative to the base 12.

As will be appreciated by one of skill in the art, the opposite side of the hot dog cooker 10 as shown in FIG. 2 preferably includes comparable pivot, main and drive links, as well as a track extension. The corresponding links and other components of the opposite side (not shown) are typically caused to move by the actuator 47 in nearly identical fashion to the links 40, 42, 44 and extension 46 described above.

Figure 4:
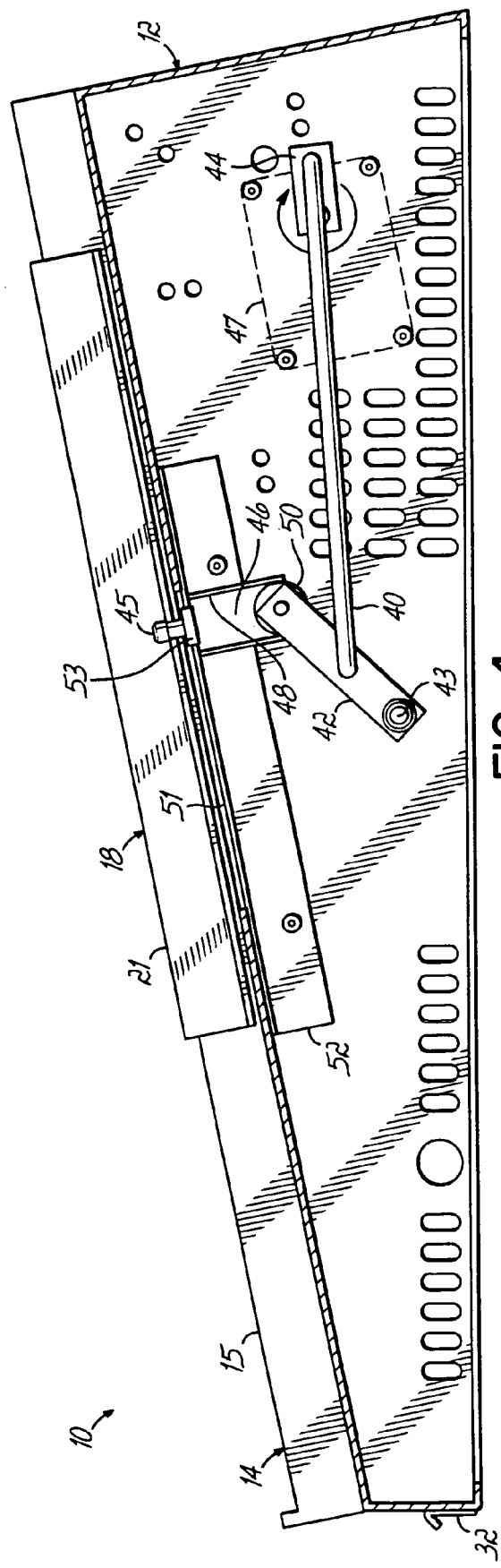
FIG. 4 is another side view of the hot dog cooker of FIG. 1, similar to FIG. 2, having its moveable rack in a third position.

FIG. 4 is another side view of the hot dog cooker 10 of FIG. 1. As shown in FIG. 4, the moveable rack 18 has moved further up the incline of the cooking surface 14 to achieve its topmost position relative to the base 12. Continued movement of the links 40, 42, 44 and wheel 50 will result in the descent of the moveable rack 18 down the incline of the cooking surface 14. Whether traveling up or down the cooking surface 14, the movement of the moveable rack 18 causes the hot dogs 22 to be pushed along ridges 16 by the bars 20. The rolling hot dogs 22 are thus circumferentially marked as the moveable rack 18 reciprocates along the cooking surface 14.

Figure 5:
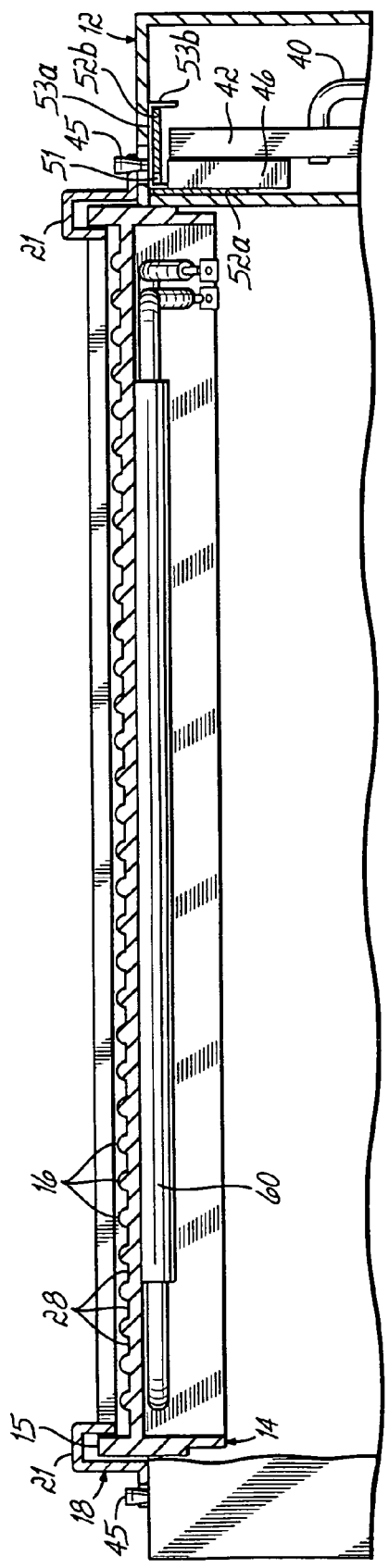
FIG. 5 is a cross-sectional view of the cooking surface taken along lines 5-5 of FIG. 1.

FIG. 5 is a cross-sectional view of the cooking surface 14 of the hot dog cooker 10 of FIG. 1 taken along line 5-5 of FIG. 1. A heating element 60 transfers heat up to the ridges 16 and the rest of the cooking surface 14 of the hot dog cooker 10. As discussed herein, the amount of heat produced by the heating element 60 is controlled using dials or other user interface mechanisms 26 accessible to the vendor. In most cases, the advantageous configuration of the cooking surface 14 and moveable rack 18 allows the hot dogs to be cooked while generating a surface heat temperature of less than about 230° Fahrenheit.

While the present invention has been illustrated by a description of various embodiments and while these embodiments have been described in considerable detail, it is not intended to restrict or in any way limit the scope of the appended claims to such detail. For instance, one skilled in the art will appreciate that while the rotating drive link 44 is shown in the drawings as only pivoting in one direction, the actuator of another embodiment may alternatively cause the drive link to rotate in different directions to achieve movement of the moveable rack.

One skilled in the art will further appreciate that there are a number of ways in which the moveable rack of another embodiment may be configured so as to glide over the cooking surface. For instance, rack overhangs 21 similar to those shown in FIG. 1 may directly contact supporting edges 15 of the cooking surface 14 such that the rack 18 slides along the supporting edges 15 when actuated. To this end, the supporting edges 15 are typically smooth to reduce friction as the moveable rack 18 slides along the supporting edges 15. One skilled in the art will appreciate that other mechanisms, such as ball bearings, lubricants, wheels and tracks may alternatively and/or additionally be employed to reduce surface friction.

Additional advantages and modifications will readily appear to those skilled in the art. For example, the base 12 may incorporate a dial or other user interface suited to control the speed at which the moveable rack is actuated. The invention in its broader aspects is therefore not limited to the specific details, representative apparatus and method, and illustrative example shown and described. Moreover, while features of the invention are described above primarily in the exemplary context of cooking hot dogs, one skilled in the art will appreciate that the features of the present invention may apply equally to the cooking of other types of meat and vegetables. Accordingly, departures may be made from such details without departing from the spirit or scope of the claims.

What is claimed is:

1. A hot dog cooking apparatus comprising:
    a base;
    a cooking surface positioned above said base and inclined in a first direction, said inclined cooking surface including ridges extending in said first direction; and
    a moveable rack positioned above said inclined cooking surface, said moveable rack including a plurality of bars generally oriented in a second direction transverse to said first direction and spaced apart from one another for receipt of a hot dog therebetween, wherein said moveable rack is moveable in said first direction such that said bars roll the hot dog along said ridges on said inclined cooking surface.

2. The hot dog cooking apparatus of claim 1 wherein said plurality of bars are parallel to one another.

3. The hot dog cooking apparatus of claim 1 wherein said plurality of bars are generally rectangular in cross section.

4. The hot dog cooking apparatus of claim 1 wherein said ridges are heated for marking the hot dog thereon circumferentially.

5. The hot dog cooking apparatus of claim 1 further comprising an actuator configured to communicate forces to said moveable rack.

6. The hot dog cooking apparatus of claim 5 further comprising a pivoting link configured to pivot on an axis and transfer the forces from said actuator to said moveable rack.

7. The hot dog cooking apparatus of claim 5 wherein said moveable rack includes an extension configured to receive the forces from said actuator.

8. The hot dog cooking apparatus of claim 1 wherein said cooking surface overhangs said base.

9. The hot dog cooking apparatus of claim 1 further including a grease tray.

10. The hot dog cooking apparatus of claim 1 further comprising a heating element positioned below said cooking surface.

11. The hot dog cooking apparatus of claim 1 wherein at least one of said bars has a flat surface for engaging and moving a hot dog along said ridges.

12. A hot dog cooking apparatus comprising:
    a base;
    a cooking surface positioned above said base, said cooking surface including ridges extending in a first direction;
    a hot dog positioned on said cooking surface; and
    a moveable rack positioned above said cooking surface, said moveable rack including a plurality of bars generally oriented in a second direction transverse to said first direction and spaced apart from one another for receipt of said hot dog therebetween, wherein said moveable rack is moveable in said first direction such that said bars roll the hot dog along said ridges on said cooking surface.

13. The hot dog cooking apparatus of claim 12 wherein said cooking surface is inclined.

14. The hot dog cooking apparatus of claim 12 wherein each of said bars includes a flat surface for engaing and moving hot dogs.

15. A method of hot dog cooking a hot dog such that marks are made circumferentially on the hot dog, the method comprising:
    heating a cooking surface positioned above a base, wherein said cooking surface is inclined in a first direction and includes ridges extending in said first direction;
    actuating along said first direction a moveable rack positioned above said inclined cooking surface, said moveable rack including a plurality of bars generally oriented in a second direction transverse to said first direction and spaced apart from one another for receipt of a hot dog therebetween; and
    rolling the hot dog along said ridges on said inclined cooking surface with at least one of said bars.

16. The method of claim 15 further comprising engaging a hot dog with a flat surface of a bar.

17. The method of claim 15 wherein heating said cooking surface further includes heating said ridges for marking the hot dog thereon circumferentially.

18. The method of claim 15 further comprising cooking the hot dog on the cooking surface.

19. The method of claim 15 wherein heating said cooking surface further includes heating the hot dog further includes generating a surface heat temperature of less than about 230° Fahrenheit.

* * * * *